(12) United States Patent
Huff

(10) Patent No.: US 9,815,499 B2
(45) Date of Patent: Nov. 14, 2017

(54) REINFORCED MOLDABLE RIVET ASSEMBLY FOR A VEHICLE

(71) Applicant: Ford Global Technologies, LLC, Dearborn, MI (US)

(72) Inventor: Garret Sankey Huff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 14/520,760

(22) Filed: Oct. 22, 2014

(65) Prior Publication Data

US 2016/0114836 A1    Apr. 28, 2016

(51) Int. Cl.
*F16B 39/02* (2006.01)
*B62D 27/02* (2006.01)
*B62D 29/04* (2006.01)
*F16B 19/04* (2006.01)

(52) U.S. Cl.
CPC .......... *B62D 27/023* (2013.01); *B62D 27/02* (2013.01); *B62D 29/048* (2013.01); *F16B 19/04* (2013.01)

(58) Field of Classification Search
CPC .... B62D 27/023; B62D 27/02; B62D 29/048; F16B 19/08; F16B 19/04
USPC .......................... 411/82, 82.2, 501, 504, 901
See application file for complete search history.

(56) References Cited

U.S. PATENT DOCUMENTS

| | | |
|---|---|---|
| 3,158,058 A | 11/1964 | Marx |
| 3,350,249 A | 10/1967 | Gregoire |
| 3,391,449 A | 7/1968 | Briles |
| 3,426,441 A | 2/1969 | Broski |
| 3,458,618 A | 7/1969 | Burns et al. |
| 3,609,851 A | 10/1971 | McMaster et al. |
| 3,874,070 A | 4/1975 | Falcioni |
| 3,952,401 A | 4/1976 | Wagner |
| 4,192,058 A | 3/1980 | Falcioni |
| 4,405,256 A * | 9/1983 | King, Jr. ................ B21J 15/043 29/507 |
| 4,478,543 A * | 10/1984 | Lyon .................... B29C 65/602 411/15 |

(Continued)

FOREIGN PATENT DOCUMENTS

EP    0376822 A1    7/1990

OTHER PUBLICATIONS

Non-Final Office Action dated Aug. 16, 2017 for U.S. Appl. No. 14/520,745 (13 pages).

*Primary Examiner* — Gary Estremsky
(74) *Attorney, Agent, or Firm* — Jason Rogers; Bejin Bieneman PLC

(57) ABSTRACT

An assembly of vehicle components includes first and second components abutting each other. At least one of the first and second components includes a non-metallic material. The first and second components respectively include overlapping first and second apertures. The assembly further includes a joining component extending through the first and second apertures. The joining component has a support body and an outer body at least partially encasing the support body. The outer body includes a polymeric material. The joining component clamps the first and second components between first and second flanges of the outer body, and the support body extends into at least one of the first and second apertures.

20 Claims, 3 Drawing Sheets

(56) References Cited

U.S. PATENT DOCUMENTS

| | | | | |
|---|---|---|---|---|
| 4,478,544 A | * | 10/1984 | Strand | B29C 66/41 411/34 |
| 4,659,268 A | * | 4/1987 | Del Mundo | F16B 19/04 411/34 |
| 4,687,395 A | * | 8/1987 | Berecz | B29C 65/601 244/132 |
| 4,687,397 A | | 8/1987 | Berecz | |
| 4,687,398 A | * | 8/1987 | Berecz | B29C 57/00 244/132 |
| 4,761,871 A | | 8/1988 | O'Connor et al. | |
| 4,817,264 A | * | 4/1989 | Worthing | B29C 66/7392 29/512 |
| 4,859,128 A | * | 8/1989 | Brecz | F16B 19/04 411/43 |
| 4,861,211 A | | 8/1989 | Dunsmore | |
| 4,877,362 A | * | 10/1989 | Berecz | B29C 65/602 411/34 |
| 4,908,928 A | | 3/1990 | Mazurik et al. | |
| 5,153,978 A | | 10/1992 | Simmons | |
| 5,195,855 A | | 3/1993 | Atkinson | |
| 5,354,160 A | * | 10/1994 | Pratt | B21J 15/00 29/243.521 |
| 5,361,483 A | | 11/1994 | Rainville et al. | |
| 7,150,594 B2 | * | 12/2006 | Keener | F16B 19/1054 411/34 |
| 7,966,710 B2 | | 6/2011 | Cheng et al. | |
| 7,966,711 B2 | | 6/2011 | Keener | |
| 8,393,068 B2 | | 3/2013 | Keener | |
| 8,448,324 B2 | | 5/2013 | Berger et al. | |
| 8,474,759 B2 | | 7/2013 | Keener | |
| 2002/0172576 A1 | * | 11/2002 | Keener | F16B 19/06 411/504 |
| 2005/0125985 A1 | | 6/2005 | Adams et al. | |
| 2006/0135022 A1 | | 6/2006 | Porter | |
| 2009/0047100 A1 | | 2/2009 | Keener | |
| 2009/0126180 A1 | | 5/2009 | Keener | |
| 2010/0001137 A1 | | 1/2010 | Keener | |
| 2013/0082416 A1 | | 4/2013 | Wakeman | |
| 2013/0243542 A1 | | 9/2013 | Saltenberger et al. | |
| 2014/0196272 A1 | * | 7/2014 | Krajewski | B21J 15/02 29/525.06 |
| 2016/0341234 A1 | | 11/2016 | Germann | |
| 2017/0066182 A1 | | 3/2017 | Trudeau | |

* cited by examiner

REINFORCED MOLDABLE RIVET ASSEMBLY FOR A VEHICLE

BACKGROUND

Vehicles, such as automobiles, pick-up trucks, sport-utility vehicles, minivans, vans and other passenger vehicles, have traditionally utilized steel for their structure. However, the need for more efficient vehicles has led to consideration of a variety of structural and body materials, depending on particular vehicle design specifications. For example, to help meet fuel efficiency targets or requirements, e.g., Corporate Average Fuel Economy (CAFE) regulations, vehicles may incorporate non-metallic, plastic, composite and/or reinforced materials such as, e.g., fiber-reinforced plastics, in place of and/or in addition to traditional metallic components to reduce weight while maintaining suitable strength and stiffness performance. The integrity and robustness of the attachments of such components and materials impact the performance of the vehicle in a variety of ways, including the strength of the vehicle and the noise, vibration and harshness (NVH) characteristics of the vehicle. However, traditional manufacturing methods may not be applicable to alternative material needs. For example, reinforced composite materials cannot be welded, and they can cause metallic fasteners to corrode. Other joining techniques do not fit into mass-market cycle times. In another example, if the vehicle materials and the fasteners have significantly different thermal expansion properties, joint integrity may be compromised due to thermal cycling. As such, it is currently difficult to provide an attachment for non-metallic, plastic, composite and/or reinforced materials such as, e.g., fiber-reinforced plastics, sufficiently robust to be applied in mass market passenger vehicles.

DRAWINGS

DETAILED DESCRIPTION

Figure 1:
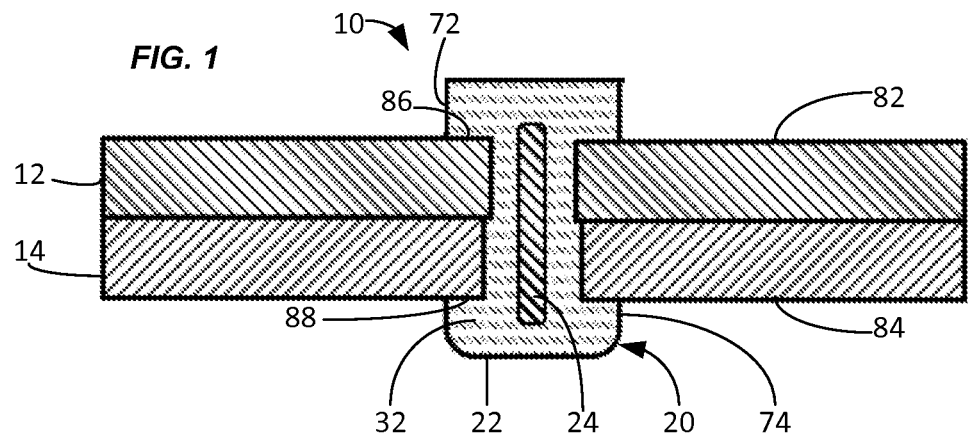
FIG. 1 is a cross-sectional view of an exemplary assembly of vehicle components according to the principles of the present disclosure.

FIG. 1 is an exemplary cross-sectional view of an exemplary assembly 10 of vehicle components according to the principles of the present disclosure. The exemplary assembly 10 includes first and second structural components 12 and 14. In one example, first and second components 12 and 14 are body components for a vehicle such as a passenger car, sport-utility vehicle, minivan, etc. In this exemplary implementation, the first and second components 12 and 14 abut each other. It should be understood that the principles of the present disclosure may be applicable to a variety of vehicle assemblies, including an assembly with more than two components.

According to the principles of the present disclosure, at least one of the first and second components 12 and 14 are formed from and/or include non-metallic, plastic, composite and/or reinforced materials such as, e.g., fiber-reinforced plastics. In one example, one of the first and second components 12 and 14 may be formed of a carbon fiber reinforced plastic material, and the other may also be formed of a carbon fiber reinforced plastic material, another non-metallic, plastic, composite and/or reinforced material, or a metallic material. The first and second components 12 and 14 may have substantially identical material compositions.

Figure 2:
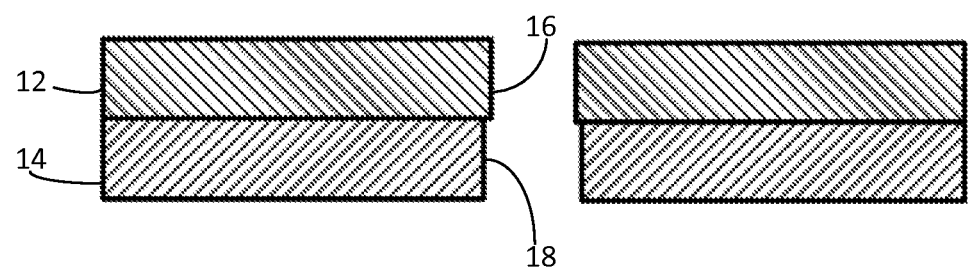
FIG. 2 is a cross-sectional view of exemplary vehicle structural members positioned with overlapping apertures therethrough, respectively.

With further reference to FIG. 2, the first and second components 12 and 14 include first and second apertures 16 and 18, respectively. First and second components 12 and 14 are positioned with the first and second apertures 16 and 18 overlapping each other. In some implementations, as shown in the exemplary illustration of FIG. 2, the first and second components 12 and 14 may be posited to center, i.e., concentrically align, the first and second apertures 16 and 18.

The assembly 10 further includes a fastener or joining component 20 extending through the first and second apertures 16 and 18 of the first and second components 12 and 14. The joining component 20 includes a moldable outer body 22 at least partially encasing a relatively rigid support shank or body 24. It should be understood that the description herein of the outer body "at least partially encasing" the support body includes, in some implementations, where a portion or portions of a support body or shank, or feature thereof, may protrude through the outer body to the exterior surface of the joining component, but the outer body extends sufficiently around the support body to maintain the support body fixed relative to the outer body. Furthermore, as used herein, "moldable" refers to both materials that may, under certain conditions, be repeatedly deformed and melted, e.g., thermoplastic polymer materials, and materials, e.g., thermosetting polymer materials, that may substantially irreversibly cure or otherwise chemically change due to applied deformation conditions i.e., heat, pressure, etc. Accordingly, the outer body 22 may include one of a thermoplastic material, e.g., nylon, and a thermoset material, e.g., epoxy or polyester. In addition to such a moldable material, the outer body 22 may include a reinforcement material 32.

Figure 3A:
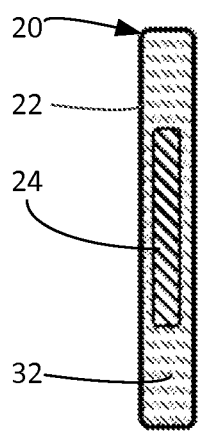
FIGS. 3A-3C are cross-sectional views of exemplary fastening components for an assembly according to the principles of the present disclosure, the fastening components including a reinforced outer moldable body encasing a support body.
Figure 3B:
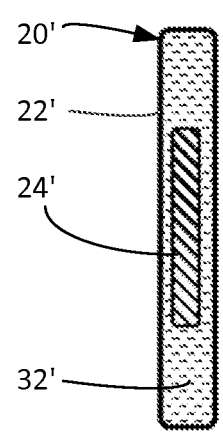
Figure 3C:
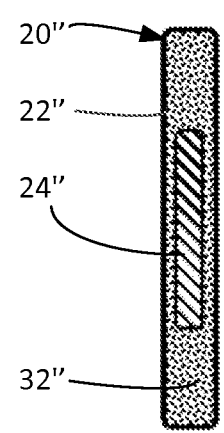

With further reference to FIGS. 3A-C, additional joining components 20' and 20", along with the joining component 20, are all illustrated in an exemplary pre-deformed state, e.g., in a substantially cylindrical shape. The additional joining components 20' and 20" have outer bodies 22' and 22", respectively, which include varying reinforcement materials 32' and 32", respectively. For example, the reinforcement materials 32, 32' and 32" may include one or more of a variety of fibrous and/or particulate materials, e.g., carbon, glass, aramid and other natural fibers; talc and metallic flakes; and glass beads. It should be understood that, apart from the variation in reinforcement materials, the description herein of joining component 20 equally applies to joining components 20' and 20".

Figure 4:
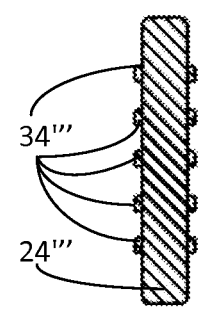
FIG. 4 is a cross-sectional view of another exemplary support body for an exemplary fastening component for an assembly according to the principles of the present disclosure.

As illustrated in FIGS. 1 and 3A-C, support bodies 24, 24' and 24" are respectively at least partially encased by the moldable outer bodies 22, 22' and 22" and each may have a substantially cylindrical shape. Referring to FIG. 4, another support body 24''' includes ribbed locking members 34''' protruding from the radially outer surface thereof. The locking members 34''' help mechanically fix the support body 24''' relative to the moldable outer body of the respective joining component in a vehicle component assembly according to the principles of the present disclosure. For example, the locking members 34''' would provide additional resistance to lengthwise movement of the support body 24''' relative to an at least partially encasing outer body. It should be understood that a support body or shank according to the principles of the present disclosure may include many geometries, including protruding locking members in a variety of configurations, such as a spaced apart knobs or a thread. Such features may significantly affect the cross sectional area of the support body or shank. It should also be understood that, apart from inclusion of locking members in the support body 24''', the description herein of the support bodies 24, 24', 24" and 24''' are equally applicable to each other.

Figure 5:
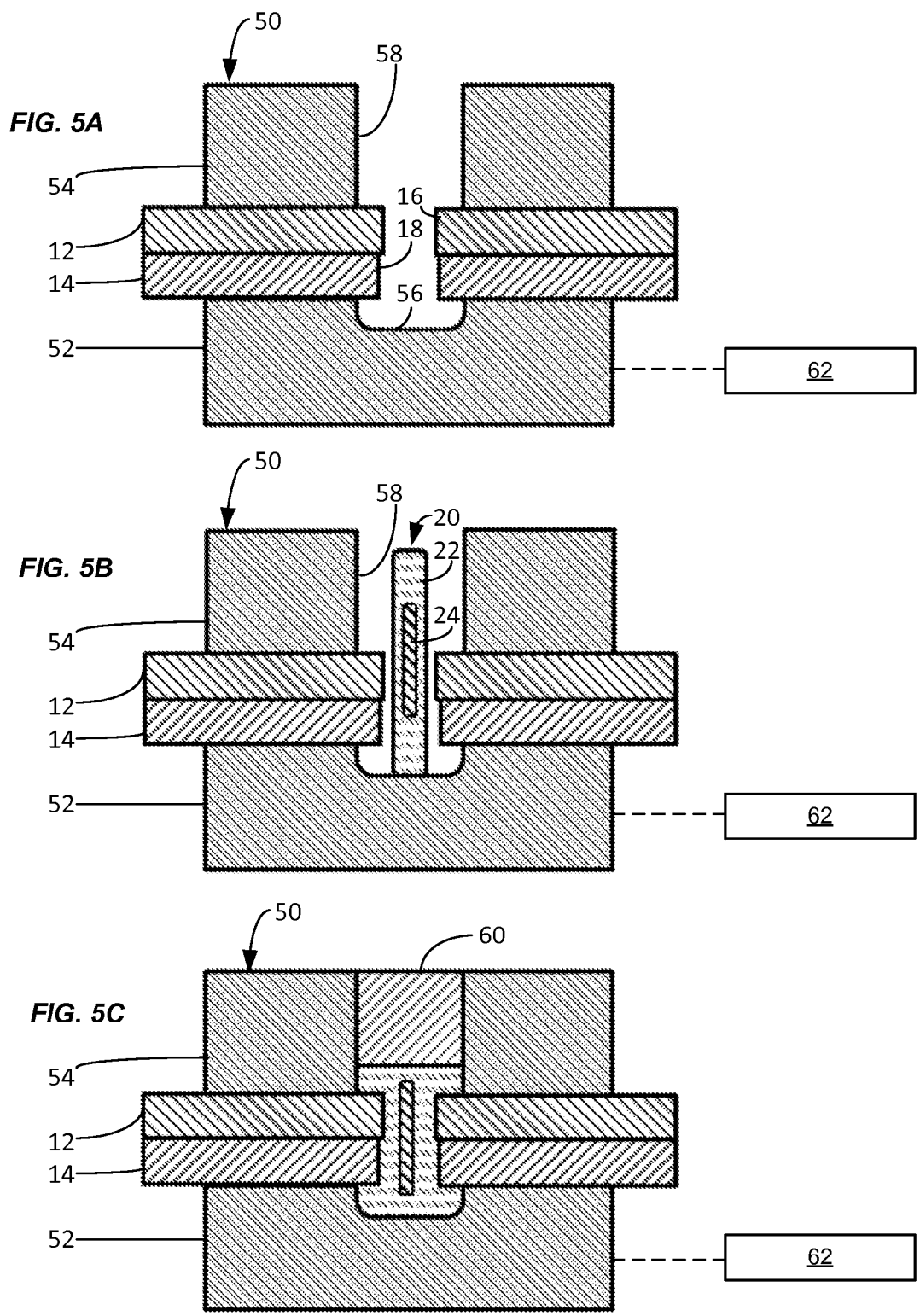
FIGS. 5A-5C are cross-sectional views of system for forming an assembly according to the principles of the present disclosure.

The system and a process 100 for forming the assembly 10 with the first and second components 12 and 14 and the joining component 20 is illustrated in FIGS. 5A-C and 6. With particular reference to FIG. 5A and a block 102 of FIG. 6, a die assembly 50 secures the first and second components 12 and 14, with the first and second apertures 16 and 18 overlapping, with a base component 52 and a nose component 54. The base component 52 has a molding recess 56, and the nose component 54 has a through aperture 58 overlapping with the molding recess 56. The first and second components 12 and 14 are positioned in the die assembly 50 with the first and second apertures 16 and 18 overlapping with the molding recess 56 and the through aperture 58. As illustrated in FIGS. 5A-C, the first and second apertures 16 and 18 may be centered, i.e., concentrically aligned, with the molding recess 56 and the through aperture 58.

Figure 6:
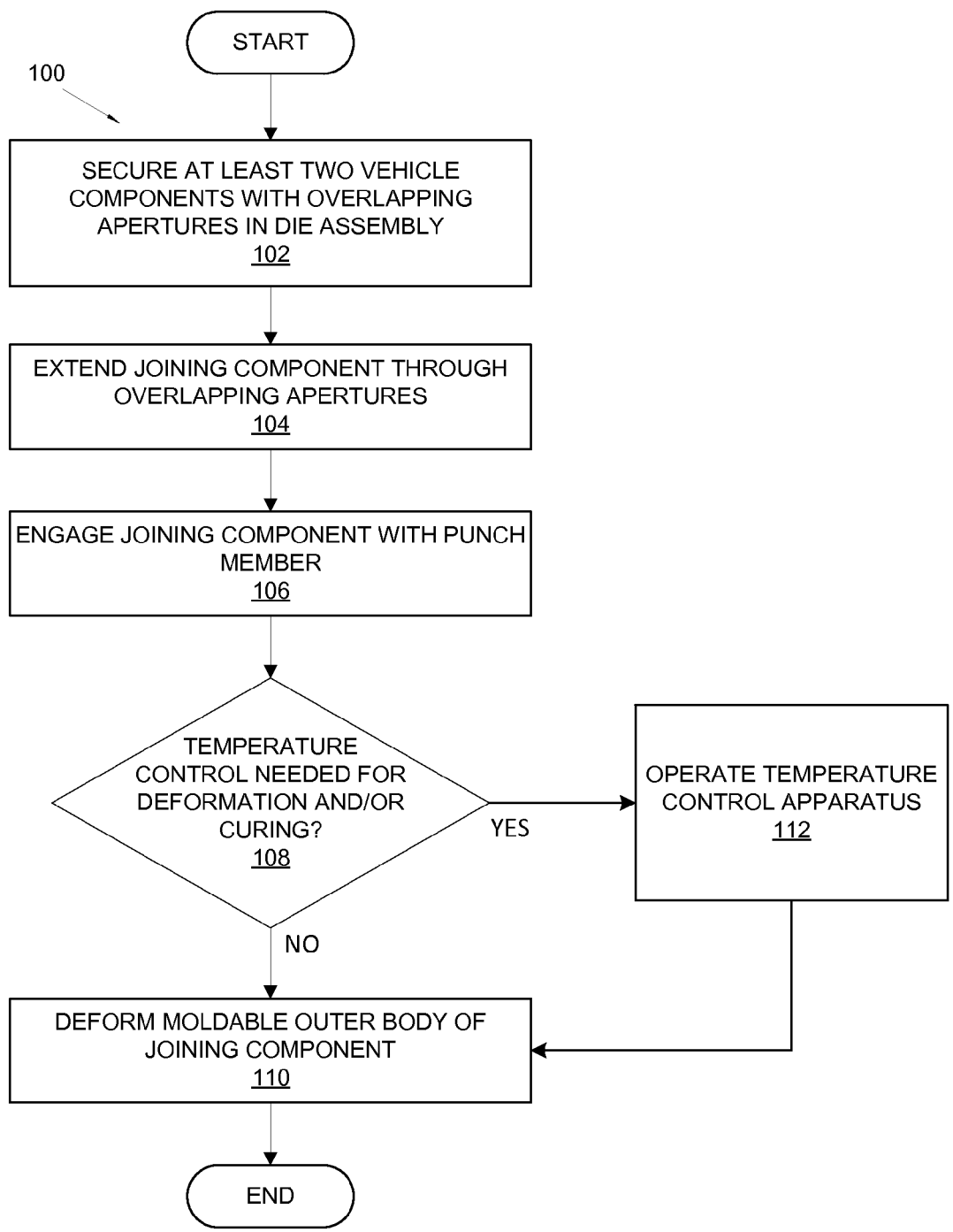
FIG. 6 illustrates an exemplary process for forming an assembly according to the principles of the present disclosure.

Referring in particular to FIG. 5B and a block 104 of FIG. 6, with the first and second components 12 and 14 secured in the die assembly 50, the joining component 20 may be extended through the through aperture 58 of the nose component 54 and the first and second apertures 16 and 18 and into engagement with the molding recess 56. In the exemplary illustrated implementation, the joining component 20 is positioned through the first and second components 12 and 14 in a substantially cylindrical, pre-deformed configuration.

Referring in particular to FIG. 5C and a block 106 of FIG. 6, with the joining component 20 positioned between the first and second vehicle components 12 and 14, a punch member 60 of the die assembly 50 extends into the through aperture 58 of the nose component 54 and engages the joining component 20, as illustrated in FIG. 5C. The punch member 60 deforms the moldable outer body 22 of the joining component 20 into the molding recess 56, the first and second apertures 16 and 18, and the region of the through aperture 58 between the punch 60 and the first vehicle component 12.

As illustrated in FIGS. 5A-C, a temperature control apparatus 62 may be thermally coupled to the die assembly 50 to provide heating or cooling to aid the curing and/or the deformation process of the moldable outer body 22. For example, referring to a block 108 of FIG. 6, one portion of the process 100 may be determining whether such temperature control is needed or desired. If not, referring to a block 110 of FIG. 6, the outer body 22 of the joining component 20 is deformed through force applied by the punch member 60 primarily, e.g., when the moldable material of the outer body 22 is a thermoplastic material.

Referring again to the block 108 of FIG. 6, if temperature control of the die assembly 50 is needed or desired, e.g., the moldable material of the outer body 22 is in the form of a thermosetting material and heat is required to cure the outer body 22, or heat facilitates deformation thereof. For example, the temperature control apparatus 62 may include a heater in thermodynamic communication with the die assembly 50 to operate as required for the particular materials and operating conditions. In another example, to facilitate manufacturing, e.g., by speeding up the process 100, the temperature control apparatus 62 may also have a cooler in thermodynamic communication with the die assembly 50 to speed the curing or hardening of the moldable outer body 22 in the deformed shape. Accordingly, referring to a block 112 of FIG. 6, the temperature control apparatus 62 is operated as desired or needed, and the process 100 continues to the block 110, where deformation through force and/or temperature control occurs.

As deformed by the punch member 60 according to the principles of the present disclosure, the joining component 20 includes first and second flanges 72 and 74 of the outer body 22 clamping the first and second components 12 and 14 together. In this exemplary illustrated implementation, the first flange 72 directly engages an outer surface 82 of the first component 12, and the second flange 74 directly engages an outer surface 84 of the second component 14. In some implementations, e.g., where the moldable material of the outer body 22 is a thermosetting material, one or both of the first flange 72 and the second flange 74 may adhesively bond to the first and second vehicle components 12 and 14, respectively. In such an implementation, the first flange 72 may have a bond 86 with the outer surface 82 of the first component 12, and the second flange 74 may have a bond 88 with the outer surface 84 of the second component 14.

In the deformation of the moldable outer body 22, the support body 24 is positioned to extending into the first and second apertures 16 and 18. In other implementations, the support body or shank 24 may extend into only one of the first and second apertures 16 and 18.

As shown in the exemplary illustrations, the first and second apertures 16 and 18 may be substantially centered relative to each other, and the deformed joining component 20 and the support body 24 thereof may be substantially centered relative to the first and second apertures 16 and 18. In other implementations, the deformed joining component 20 and the support body 24 thereof may be substantially centered relative to at least one of the first and second apertures 16 and 18.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An assembly of vehicle components comprising:
first and second components abutting each other, at least one of the first and second components including a non-metallic material, the first and second components respectively including overlapping first and second apertures; and
a joining component extending through the first and second apertures, the joining component having a support body and an outer body, the outer body including first and second flanges outside of the first and second apertures, respectively, the outer body encasing the support body one of at and within an exterior surface of the joining component, the outer body including a polymeric material, the outer body clamping the first and second components between the first and second flanges, the support body extending into at least one of the first and second apertures, the support body having a passive configuration relative to the clamping of the first and second components between the first and second flanges.

2. The assembly of claim 1, wherein the non-metallic material of the at least one of the first and second components is a composite material.

3. The assembly of claim 2, wherein the composite material is a fiber reinforced polymer material.

4. The assembly of claim 3, wherein the fiber reinforced plastic material includes carbon fiber material.

5. The assembly of claim 1, wherein the first and second components have a substantially identical material composition.

6. The assembly of claim 1, wherein the support body has a substantially cylindrical shape.

7. The assembly of claim 6, wherein the support body includes a locking member protruding from an outside surface of the support body into the outer body.

8. The assembly of claim 7, wherein the locking member is formed as one of a rib and a thread.

9. The assembly of claim 1, wherein the joining component is substantially centered relative to at least one of the first and second apertures.

10. The assembly of claim 1, wherein the joining component is substantially centered relative to at least the at least one of the first and second apertures into which the support body extends.

11. The assembly of claim 10, wherein the support body is substantially centered relative to at least to the at least one of the first and second apertures into which the support body extends.

12. The assembly of claim 1, wherein the first flange directly engages the first component.

13. The assembly of claim 12, wherein the second flange directly engages the second component.

14. The assembly of claim 12, wherein the direct engagement of the first flange and the first component includes an adhesive bond.

15. The assembly of claim 1, wherein the outer body includes one of a thermoplastic material and a thermoset material.

16. The assembly of claim 15, wherein the outer body includes a reinforcement material.

17. The assembly of claim 16, wherein the reinforcement material includes at least one of carbon, glass, and aramid fibers.

18. The assembly of claim 16, wherein the reinforcement material includes at least one of talc, metallic, and glass particles.

19. A joint of vehicle structural components comprising:
first and second components directly overlapping each other, at least one of the first and second components including a reinforced composite material, the first and second components respectively including first and second apertures substantially aligned with each other; and
a joining component extending through the first and second apertures, the joining component having a support shank and an moldable body, the moldable body including first and second flanges outside of the first and second apertures, respectively, the moldable body encasing the support shank one of at and within an exterior surface of the joining component, the moldable body including a reinforcement material and one of a thermoplastic material and a thermoset material, the joining component directly clamping the first and second components with first and second flanges of the moldable body, respectively, the support shank extending into the first and second apertures, the support shank having a passive configuration relative to the clamping of the first and second components between the first and second flanges.

20. The assembly of claim 19, the reinforcement material of the moldable body includes at least one of carbon fibers, glass fibers, aramid fibers, talc flakes, metallic flakes, and glass beads.

* * * * *